United States Patent
Swanson et al.

(10) Patent No.: US 12,448,894 B2
(45) Date of Patent: Oct. 21, 2025

(54) AERODYNAMIC TURBOMACHINE COMPONENT WITH COOLING FEATURES AND METHOD OF MAKING

(71) Applicant: GE Infrastructure Technology LLC, Greenville, SC (US)

(72) Inventors: Caitlin Hillary Swanson, Columbia, SC (US); William Scott Zemitis, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/423,522

(22) Filed: Jan. 26, 2024

(65) Prior Publication Data

US 2025/0243765 A1  Jul. 31, 2025

(51) Int. Cl.
| | |
|---|---|
| G06F 7/48 | (2006.01) |
| B33Y 50/00 | (2015.01) |
| F01D 5/18 | (2006.01) |
| G06F 30/17 | (2020.01) |
| G06F 30/27 | (2020.01) |
| G06F 113/10 | (2020.01) |

(52) U.S. Cl.
CPC .............. *F01D 5/187* (2013.01); *B33Y 50/00* (2014.12); *G06F 30/17* (2020.01); *G06F 30/27* (2020.01); *F05D 2240/303* (2013.01); *G06F 2113/10* (2020.01)

(58) Field of Classification Search
CPC ......... F01D 5/187; B33Y 50/00; G06F 30/17; G06F 30/27; G06F 2113/10; F05D 2240/303
See application file for complete search history.

(56) References Cited

U.S. PATENT DOCUMENTS

| | | | |
|---|---|---|---|
| 6,174,135 | B1 | 1/2001 | Lee |
| 8,047,787 | B1 | 11/2011 | Liang |
| 9,127,560 | B2 | 9/2015 | Collier et al. |
| 9,771,806 | B2 | 9/2017 | Okita et al. |
| 9,782,829 | B2 * | 10/2017 | Morris ..................... B22F 5/10 |
| 10,247,009 | B2 | 4/2019 | Myers et al. |
| 2006/0056969 | A1 | 3/2006 | Jacala et al. |

(Continued)

FOREIGN PATENT DOCUMENTS

CN   112177683 B   8/2021

OTHER PUBLICATIONS

Aleksyuk, A. I. "Body Shape Optimisation for Enhanced Aerodynamic Cooling." Fluid Dynamics 58.8 (2023): 1420-1430. (Year: 2023).*

(Continued)

*Primary Examiner* — Nithya J. Moll
(74) *Attorney, Agent, or Firm* — Charlotte Wilson; James Pemrick; Hoffman Warnick LLC

(57) ABSTRACT

A gas turbine airfoil includes a trailing edge cooling hole that has an elliptical cross-sectional baseline shape. In addition, the exit passage wall leading to the trailing edge cooling hole has a surface that varies according to an exit passage profile. Applying an iterative method of embodiments can produce a final exit passage profile with significantly reduced thermal strain during operation as compared to the prior art, resulting in improved component life.

13 Claims, 8 Drawing Sheets

(56) References Cited

U.S. PATENT DOCUMENTS

2014/0086724 A1      3/2014  Tibbott et al.
2022/0205364 A1*     6/2022  Gray ...................... F01D 5/187

OTHER PUBLICATIONS

Hu, Kaibin et al., "Optimization of turbine blade trailing edge cooling using self-organized geometries and multi-objective approaches", Energy, Elsevier, Amsterdam, NL, vol. 289, Dec. 22, 2023, pp. 1-17.
International Search Report for related PCT Application No. PCT/US2025/012386 dated May 6, 2025, 1 page.

* cited by examiner

AERODYNAMIC TURBOMACHINE COMPONENT WITH COOLING FEATURES AND METHOD OF MAKING

TECHNICAL FIELD

The disclosure relates generally to cooling arrangements in an aerodynamic turbomachine component and, more particularly, to a turbine blade including cooling apertures and structures located along the trailing edge.

BACKGROUND

Aerodynamic turbomachine components, particularly those in the hot gas flow path of a gas turbine engine, such as turbine blades in an expansion turbine, experience thermal strain that can result in creep and reduction of useful life of such components. Various strategies have been employed to reduce thermal strain, but further reductions are always sought.

BRIEF DESCRIPTION

All aspects, examples and features mentioned below can be combined in any technically possible way.

An aspect of the disclosure provides a method of making an aerodynamic component comprising: creating a digital model of the aerodynamic component and a cooling circuit thereof, the cooling circuit including an exit passage defined in a body of the aerodynamic component and including a cooling hole at a trailing edge of the aerodynamic component, the exit passage including an exit passage profile; establishing a baseline profile of the exit passage and using the baseline profile of the exit passage as an initial value of the exit passage profile; simulating operation of the aerodynamic component using the digital model, including simulating an operating environment of the aerodynamic component; retrieving a value of a first parameter from the simulated operation of the aerodynamic component; comparing the value of the first parameter to one of a previously measured value or an initial value to determine a difference therebetween; adjusting the exit passage profile in the digital model of the aerodynamic component responsive to the difference being greater than a threshold percentage value; repeating simulating, retrieving, comparing, and adjusting until the difference is no more than the threshold percentage value, whereby the exit passage profile as last adjusted is a final exit passage profile; and forming the aerodynamic component including the final exit passage profile.

Another aspect of the disclosure includes any of the preceding aspects, and the forming includes casting the aerodynamic component.

Another aspect of the disclosure includes any of the preceding aspects, and the forming includes using additive manufacturing (AM) and at least the digital model of the aerodynamic component with the final exit passage profile.

Another aspect of the disclosure includes any of the preceding aspects, and the exit passage baseline profile includes a plurality of baseline cross-sectional shapes thereof, the plurality of baseline cross-sectional shapes including a cooling hole baseline cross-sectional shape in a plane parallel to the trailing edge at the cooling hole; and wherein the adjusting the exit passage profile includes adjusting each baseline cross-sectional shape of the plurality of baseline cross-sectional shapes.

Another aspect of the disclosure includes any of the preceding aspects, and the simulating, the retrieving, the comparing, the adjusting, and the repeating are done for each of the plurality of baseline cross-sectional shapes starting with the cooling hole baseline cross-sectional shape and then each progressively farther inward baseline cross-sectional shape of the plurality of baseline cross-sectional shapes.

Another aspect of the disclosure includes any of the preceding aspects, and further comprising establishing an instance of an artificial intelligence (AI) trained on at least one of thermodynamic modeling, aerospace engineering, and materials science; and using the AI to estimate a desired adjustment for the exit passage profile; and wherein the adjusting is based at least on the estimated desired adjustment.

An aspect of the disclosure provides a method of making an aerodynamic component, comprising: providing a digital model of the aerodynamic component including a cooling circuit defined in a body thereof, the cooling circuit including an exit passage extending from an entry thereof to a cooling hole at a trailing edge of the body, the exit passage having an exit passage profile including a plurality of cross-sectional shapes at predefined points along a length of the exit passage, the predefined points including at least the cooling hole of the exit passage and the entry of the exit passage; providing an exit passage baseline profile including a baseline cross-sectional shape for each of the predefined points; determining a final exit passage profile, for the respective cross-sectional shape at each of the predefined points starting with the cooling hole and progressing inward to the entry, by: simulating operation of the aerodynamic component and an operating environment thereof using at least the exit passage baseline profile; retrieving a value of a first parameter from the simulated operation of the aerodynamic component; comparing the value of the first parameter to one of a previously retrieved value or an initial value to determine a difference therebetween; adjusting the cross-sectional shape responsive to the difference being greater than a threshold percentage value; and repeating the retrieving, the comparing, and the adjusting until the difference is no more than the threshold percentage value, whereby the cross-sectional shape as last adjusted is a final cross-sectional shape for the predefined point; and forming the aerodynamic component including the final exit passage profile.

Another aspect of the disclosure includes any of the preceding aspects, and the determining the final exit passage profile includes determining the final cross-sectional shape for each predefined point sequentially.

Another aspect of the disclosure includes any of the preceding aspects, and the determining the final exit passage profile includes determining the final cross-sectional shape for each predefined point simultaneously.

Another aspect of the disclosure includes any of the preceding aspects, and the providing the exit passage baseline profile includes using a previously determined final exit passage profile as the exit passage baseline profile.

Another aspect of the disclosure includes any of the preceding aspects, and the determining the final exit passage profile is repeated using each subsequent final exit passage profile until a difference in values of a second parameter retrieved during simulating from one repetition to a next repetition is no more than a second threshold percentage value.

Another aspect of the disclosure includes any of the preceding aspects, and wherein the cooling hole baseline cross-sectional shape is an elliptical cross-sectional shape that includes a major axis and a minor axis, and a ratio of a length of the major axis to a length of the minor axis is in a range of from about 1.3 to about 1.7.

An aerodynamic component for a turbomachine, comprising: an airfoil supported by a platform, the airfoil having a leading edge and a trailing edge spaced apart from the leading edge in an axial direction; and a cooling circuit including a cooling hole formed in a trailing edge surface of the trailing edge at an end of an exit passage defined in a body of the aerodynamic component and having an exit passage profile, wherein a final exit passage profile of the exit passage is determined by: providing a digital model of the aerodynamic component including a baseline profile of the exit passage and using the exit passage baseline profile as an initial value of the exit passage profile; establishing an instance of an artificial intelligence (AI) trained on at least one of thermodynamic modeling, aerospace engineering, and materials science; simulating operation of the aerodynamic component and an operating environment thereof using a computing device and the digital model of the aerodynamic component; determining a current value of a first parameter of the aerodynamic component during the simulating; if a previous value of the first parameter has been determined, determining a change between the previous value and the current value; responsive to the change exceeding a threshold percentage value, using the AI to estimate a desired adjustment to the exit passage profile and adjusting the exit passage profile based at least in part on the AI estimated desired adjustment; and repeating the simulating, the determining a current value of the first parameter, the determining a change, and the adjusting the exit passage profile until the change is no more than the threshold percentage value, whereby the exit passage profile as last adjusted becomes the final exit passage profile.

Another aspect of the disclosure includes any of the preceding aspects, and the exit passage baseline profile includes a cooling hole baseline cross-sectional shape; and the simulating, the determining a current value of the first parameter, the determining a change, and the adjusting the exit passage profile are performed using the cooling hole baseline cross-sectional shape.

Another aspect of the disclosure includes any of the preceding aspects, and the exit passage baseline profile includes at least one additional cross-sectional shape; and the simulating, the determining a current value of the first parameter, the determining a change, and the adjusting the exit passage profile are performed first using the cooling hole baseline cross-sectional shape and then using each of the at least one additional cross-sectional shape from closest to the cooling hole to farthest from the cooling hole.

Another aspect of the disclosure includes any of the preceding aspects, and the at least one additional cross-sectional shape includes an exit passage entry baseline cross-sectional shape that is farthest from the cooling hole.

Another aspect of the disclosure includes any of the preceding aspects, and the at least one additional cross-sectional shape includes a cross-sectional shape between the cooling hole cross-sectional shape and the exit passage entry.

Another aspect of the disclosure includes any of the preceding aspects, and the exit passage baseline profile includes an elliptical cross-sectional shape.

Another aspect of the disclosure includes any of the preceding aspects, and the elliptical cross-sectional shape includes a major axis and a minor axis, and a ratio of a length of the major axis to a length of the minor axis is in a range of from about 1.3 to about 1.7.

Another aspect of the disclosure includes any of the preceding aspects, and the final exit passage profile includes a portion substantially in accordance with the Cartesian coordinate values of X, Y and Z set forth in TABLE I, with an origin located at an intersection of a radial axis of the aerodynamic component with a centerline of a gas turbine engine in which the aerodynamic component will be deployed, wherein the Cartesian coordinate values are expressed in units of distance, and wherein points described by the X, Y, and Z values for each cross-sectional shape are connected by smooth continuing arcs to define respective cross-sectional shapes at each predefined location along at least a portion of the exit passage, the cross-sectional shapes being joined smoothly with one another to form the final exit passage profile.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
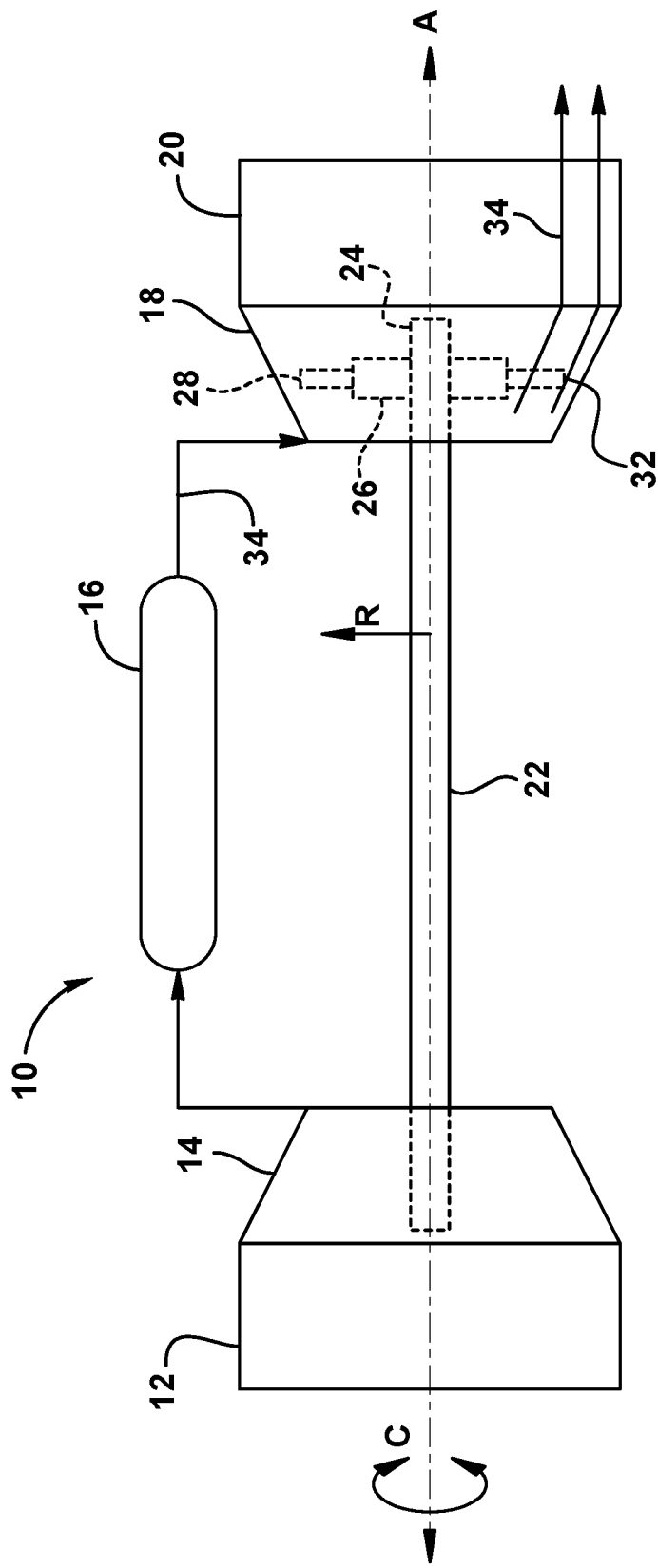
FIG. 1 is a schematic illustration of a gas turbine engine in which embodiments of the disclosure can be used.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within the illustrative application of a turbomachine aerodynamic component with improved cooling features. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" or "fore" referring to the front or compressor end of the turbomachine, and "aftward" or "aft" referring to the rearward or turbine end of the turbomachine.

It is often required to describe parts that are at different radial positions with regard to a center axis. The term "axial" refers to movement or position parallel to an axis, e.g., an axis of a turbomachine. The term "radial" refers to movement or position perpendicular to an axis, e.g., an axis of a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a casing extending about an axis of a turbomachine. As indicated above, it will be appreciated that such terms may be applied in relation to the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present and that the description includes instances where the event occurs or the component is present and instances where the event does not occur or the component is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

Embodiments as disclosed herein can be implemented in a gas turbine engine 10, such as that illustrated in FIG. 1. Such a gas turbine engine 10 can include an inlet 12 supplying air to a compressor 14 that includes a plurality of aerodynamic components, such as blades and nozzles, that cooperate to compress incoming air and supply it to a combustor 16. Combustor 16 mixes fuel with the incoming compressed air and ignites the mixture to generate and discharge energized hot gases 34. An expansion turbine 18 can include a rotor 24 with a rotor wheel 26 with a plurality of aerodynamic components 28, such as turbine blades, mounted thereon. The expansion turbine 18 can receive hot energized gases 34 and direct them via a hot gas flow path 32 over aerodynamic components 28, thereby driving rotor 24, which in turn drives main shaft 22, which drives compressor 14. Rotor 24, main shaft 22, and blades in compressor 14 rotate about a centerline A of gas turbine engine 10 in a circumferential direction C. Energized hot gases 34 continue as exhaust through an exhaust system 20 and are discharged to the surroundings or otherwise used. Collectively, the aerodynamic components of compressor 12 and expansion turbine 18 can be referred to as "turbomachine aerodynamic components." As is known, it can be advantageous to cool such turbomachine aerodynamic components, particularly in the expansion turbine 18, to enjoy longer component life and improved operational efficiency.

Centerline A also identifies an axial direction A of gas turbine engine 10. Centerline A may also be referred to as a center axis or a rotational axis of gas turbine 10. As also seen in FIG. 1, a radial direction R can extend away from centerline A and revolve about centerline A in circumferential direction C.

Figure 2:
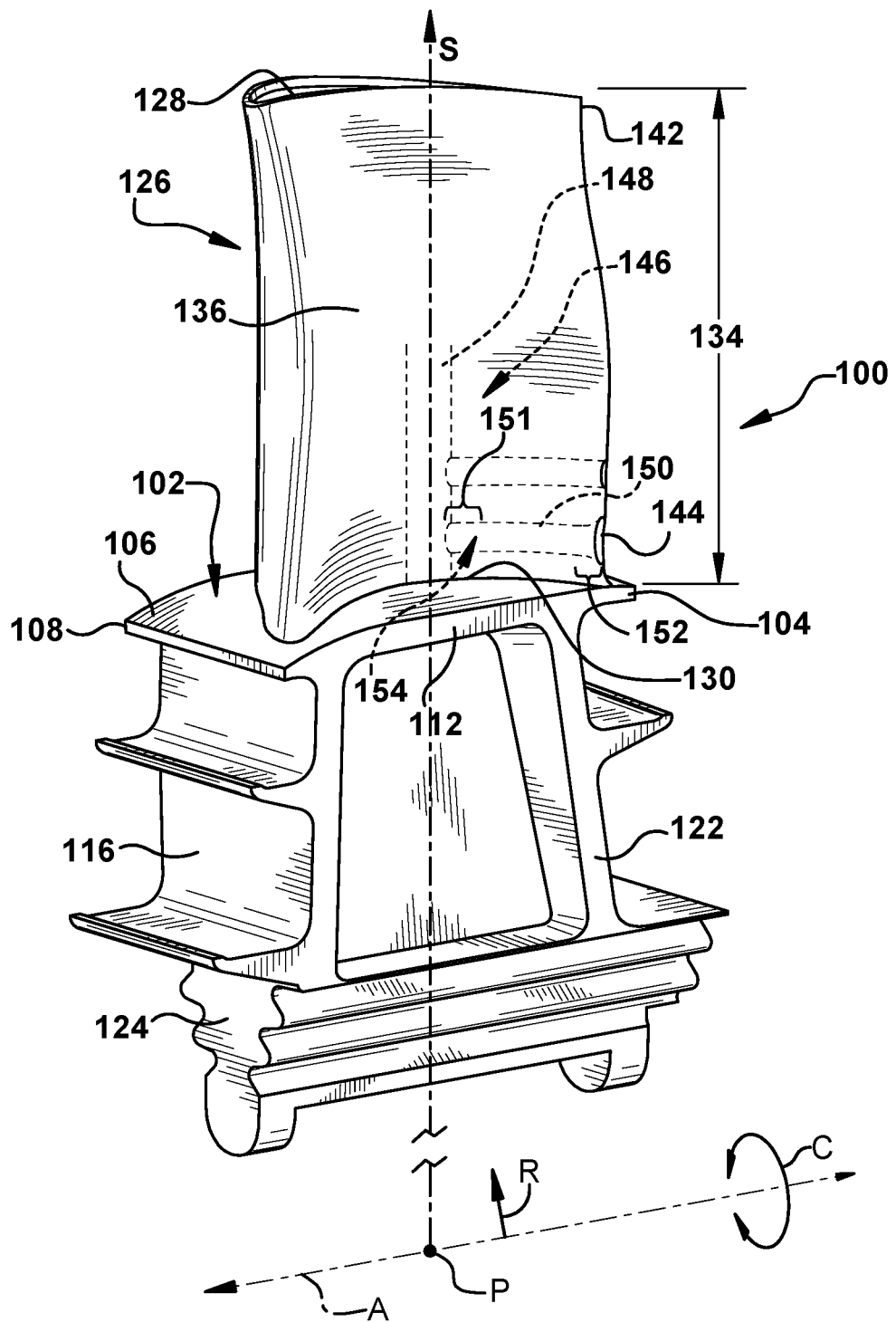
FIG. 2 is an isometric elevation of a turbomachine aerodynamic component according to embodiments disclosed herein.
Figure 3:
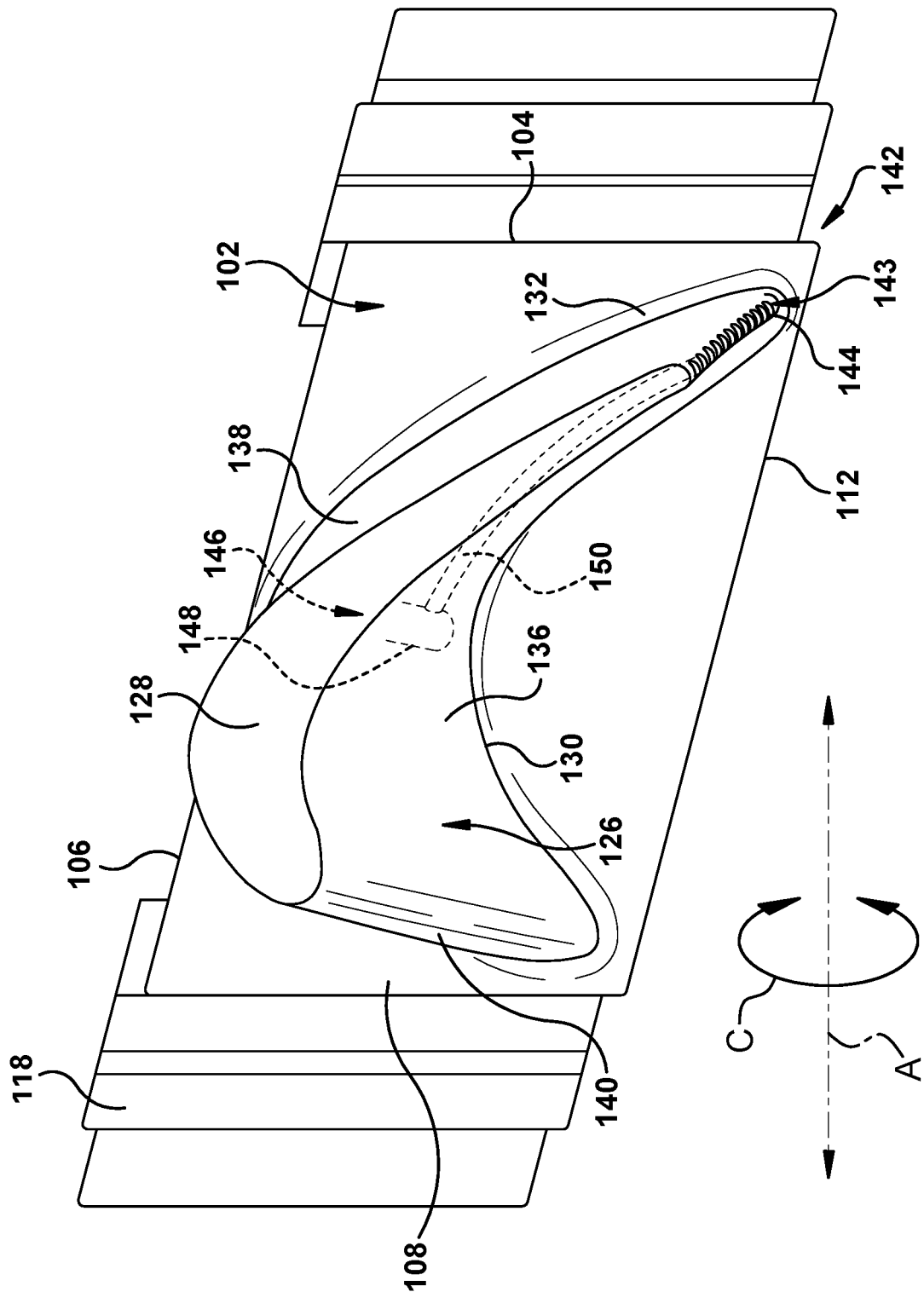
FIG. 3 is a top view of a turbomachine aerodynamic component according to embodiments disclosed herein.

An example of a turbomachine aerodynamic component 100 that can include optimized cooling features is shown in FIGS. 2 and 3. A platform 102 supports an airfoil 126, the platform 102 itself being mounted in a turbomachine, such as gas turbine 10 of FIG. 1, via a shank 116 and a dovetail 124. Platform 102 has aft and forward edges 104, 108, respectively, spaced apart in axial direction A (bottom of FIG.), as well as leading and trailing edges 106, 112, respectively, spaced apart in circumferential direction C (bottom of FIG.). Airfoil 126 has a base portion 130 adjacent platform 102 and a body portion 134 that extends radially away from platform 102 and base portion 130 in a radial direction R (bottom of FIG.). Airfoil 126 also has a tip 128 extending from body portion 134, a pressure side 136, a suction side 138 (FIG. 3), a leading edge 140 (FIG. 3), and a trailing edge 142 spaced apart from leading edge 140 in axial direction A. As particularly seen in FIG. 3, which is a top view of a turbomachine aerodynamic component 100, trailing edge 142 of airfoil 126 can include a plurality of cooling holes 144, including a bottommost cooling hole 144 in closest proximity to platform 102. Cooling holes 144 can be part of a cooling circuit 146 defined in airfoil 126.

The transition between the platform 102 and the airfoil 126 is subject to mechanical and thermal stresses, which can lead to creep and/or cracking. In the present application, the bottommost cooling hole 144 is particularly important in directing cooling flow from the trailing edge 142 of the airfoil 126 toward the platform 102. The contours of the cooling hole 144 affect the flow velocity and direction of the cooling flow. It has been found that optimization of the portions of the cooling hole profile closest to the platform 102 (that is, the bottom or trough of the cooling hole 144) can result in improved cooling in this stress-prone region.

The directions A, C, and R are illustrated by arrows at the bottom of FIG. 2. A radial axis S is also shown extending radially from centerline A. In some embodiments, radial axis S can represent a stacking axis of aerodynamic component 100 or a portion thereof and/or radial axis S can represent a radial centerline of aerodynamic component 100 or a portion thereof. As schematically illustrated, an origin P can be located at an intersection point of radial axis S with centerline A. In embodiments, origin P is a common origin that can be used for describing profiles of aerodynamic component 100 and parts thereof. For example, with additional reference to FIG. 5, a Cartesian coordinate system can be located at origin P, with an X axis coinciding with centerline A, a Z axis coinciding with radial axis S, such as a stacking axis and/or a radial centerline of aerodynamic component 100, and a Y axis mutually perpendicular to the X and Z axes.

Figure 4:
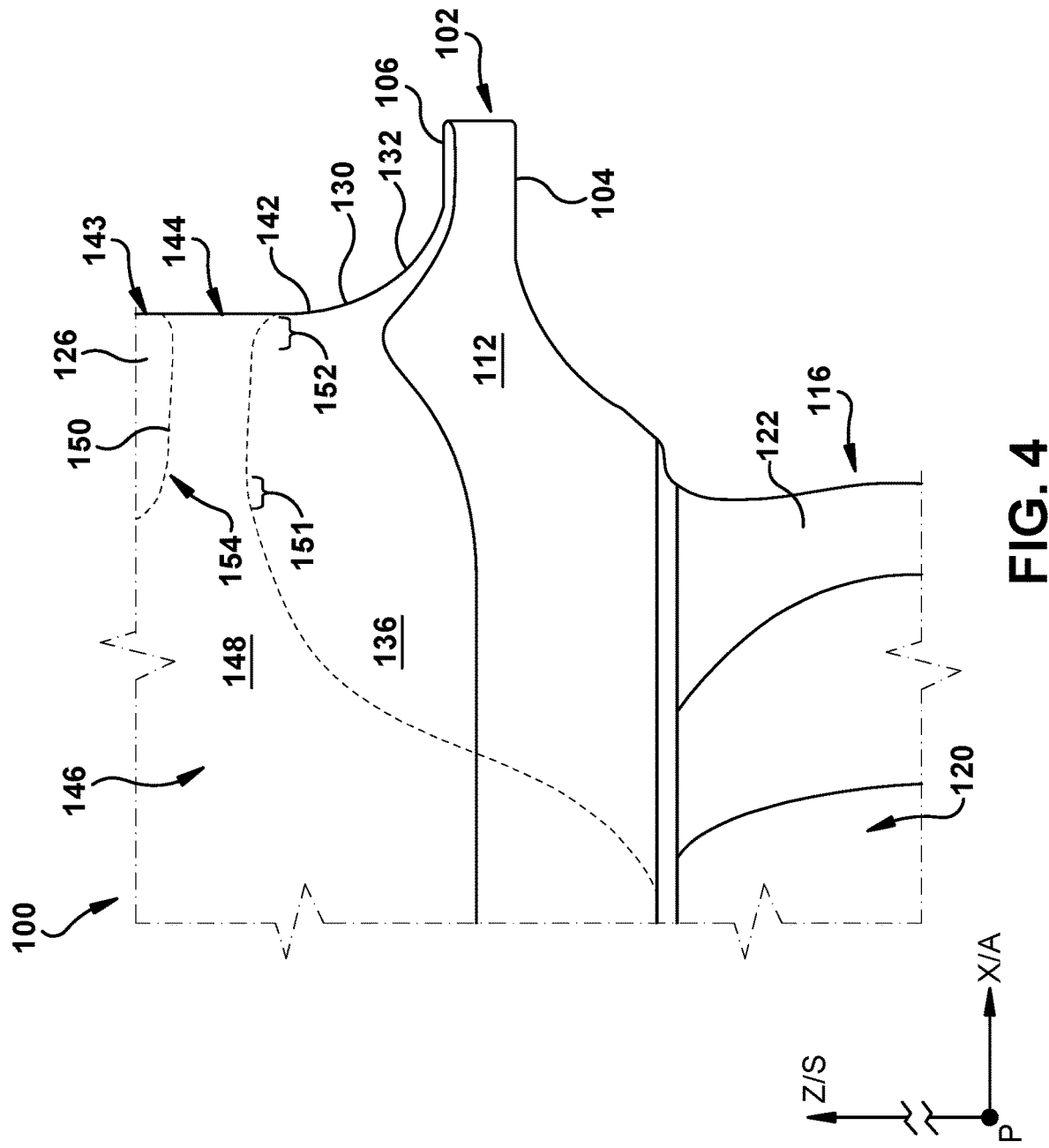
FIG. 4 is an enlarged side view of a platform area of a turbomachine aerodynamic component according to embodiments disclosed herein.
Figure 5:
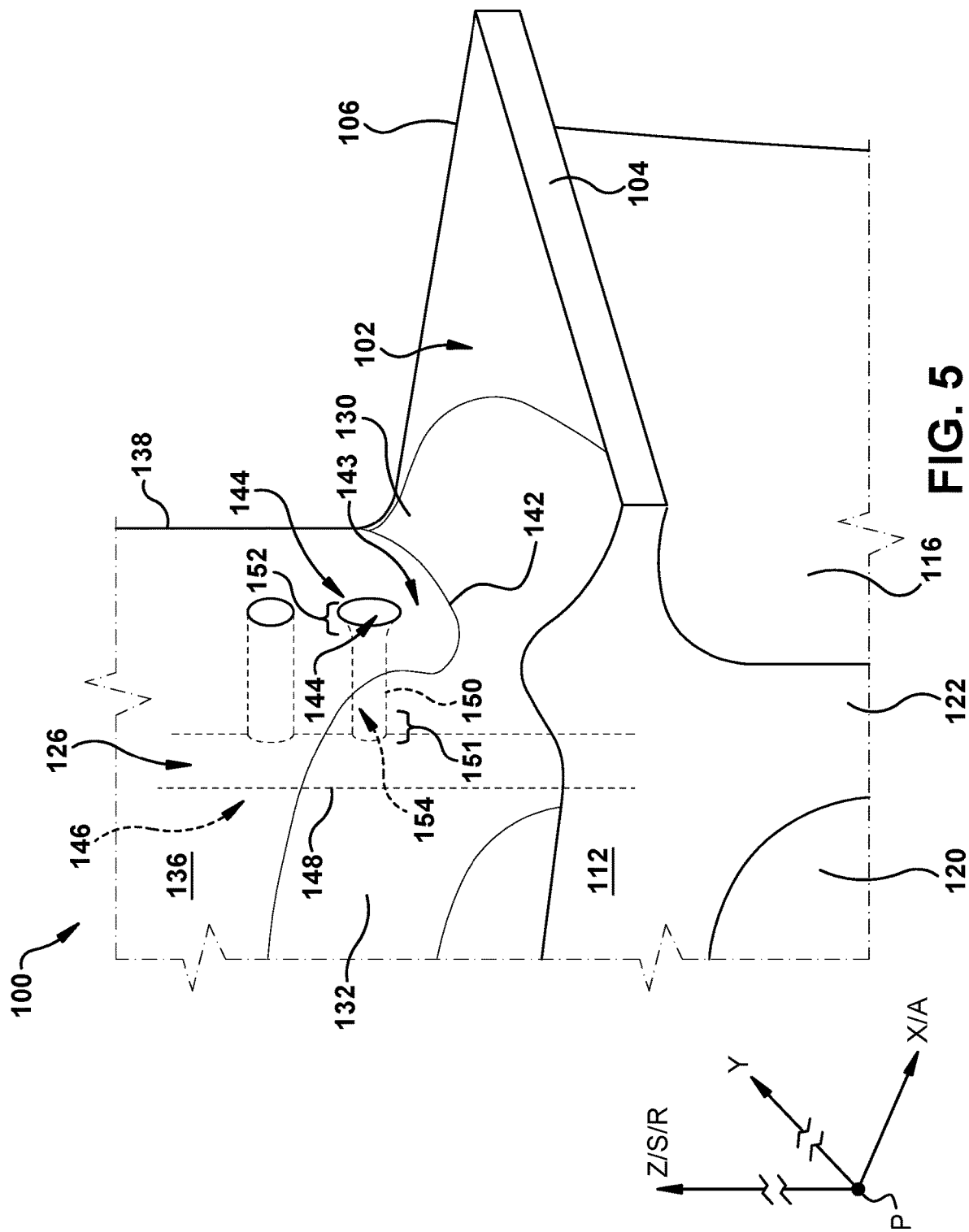
FIG. 5 is an enlarged aft-looking-forward perspective view of an interface between an airfoil trailing edge and a platform area of a turbomachine aerodynamic component according to embodiments disclosed herein.

As seen in FIGS. 4 and 5, a cooling hole 144 can be in fluid communication with coolant supply passage 148, such as via an exit passage 150. Cooling hole 144 can be formed in a surface 143 of trailing edge 142 at an end 152 of exit passage 150. Exit passage 150 can be defined by an exit passage wall 154 in airfoil 126. In embodiments, exit passage 150 can include an exit passage profile that can include a cross-sectional shape of exit passage 150 at a respective predefined point, and there can be a plurality of such predefined points with respective cross-sectional shapes. For example, as better seen in FIGS. 6-8, exit passage 150 can have a profile ending in a cross-sectional shape of exit or cooling hole 144, which can be approximated using an elliptical shape $H_0$ (FIG. 8) having a major axis $a_{H0}$ that is substantially parallel to trailing edge surface 143 and a minor axis $b_{H0}$ orthogonal to major axis $a_{H0}$. In embodiments, a ratio of a length of the major axis $a_{H0}$ of the elliptical cross-sectional shape $H_0$ to a length of a minor axis $b_{H0}$ of the elliptical cross-sectional shape $H_0$ is in a range of from about 1.3 to about 1.7, such as about 1.5.

Figure 6:
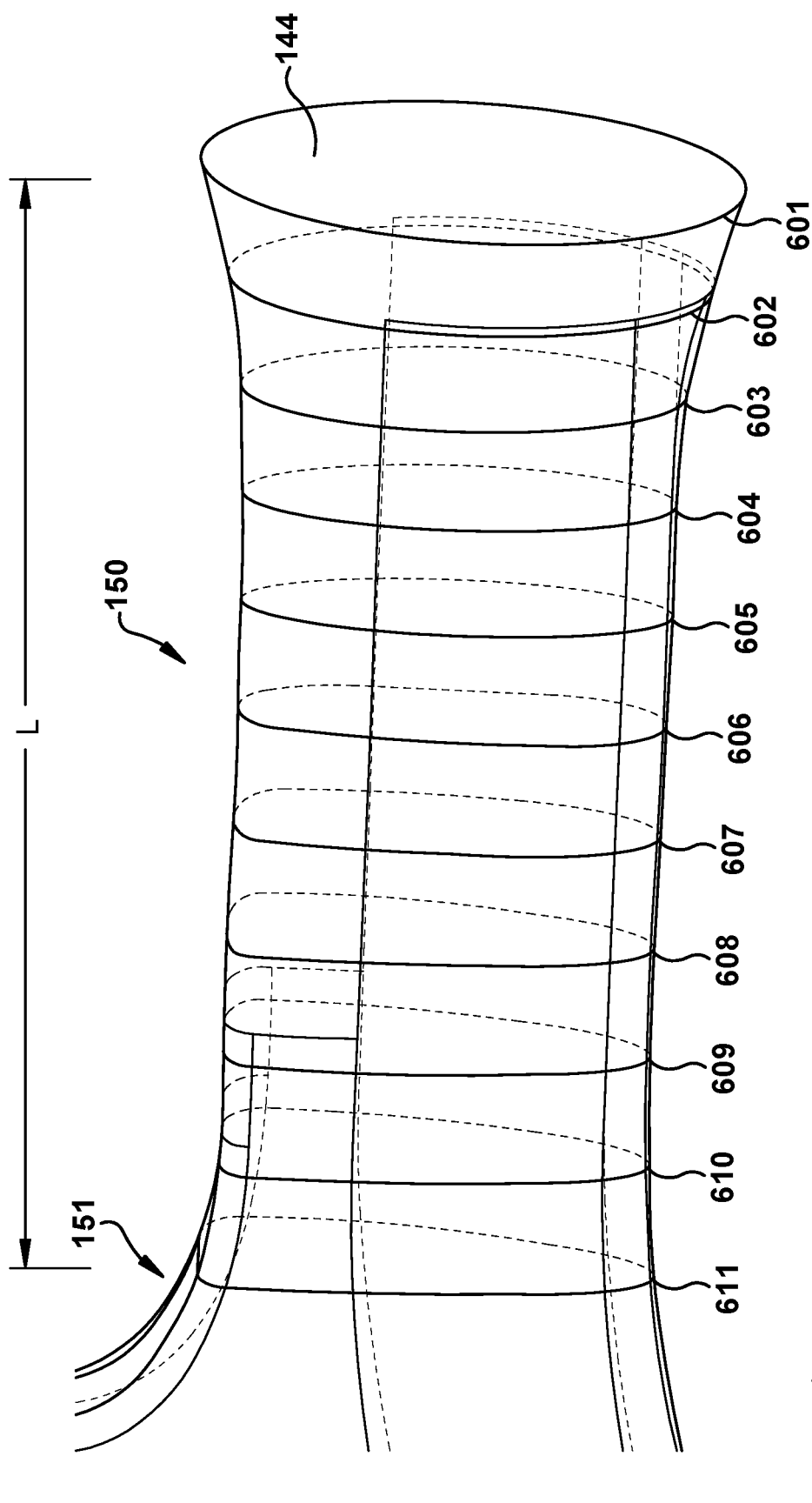
FIG. 6 is an enlarged schematic isometric transparent view of a portion of a cooling circuit in a turbomachine aerodynamic component showing example sections describing a profile of an exit passage thereof according to embodiments disclosed herein.
Figure 7:
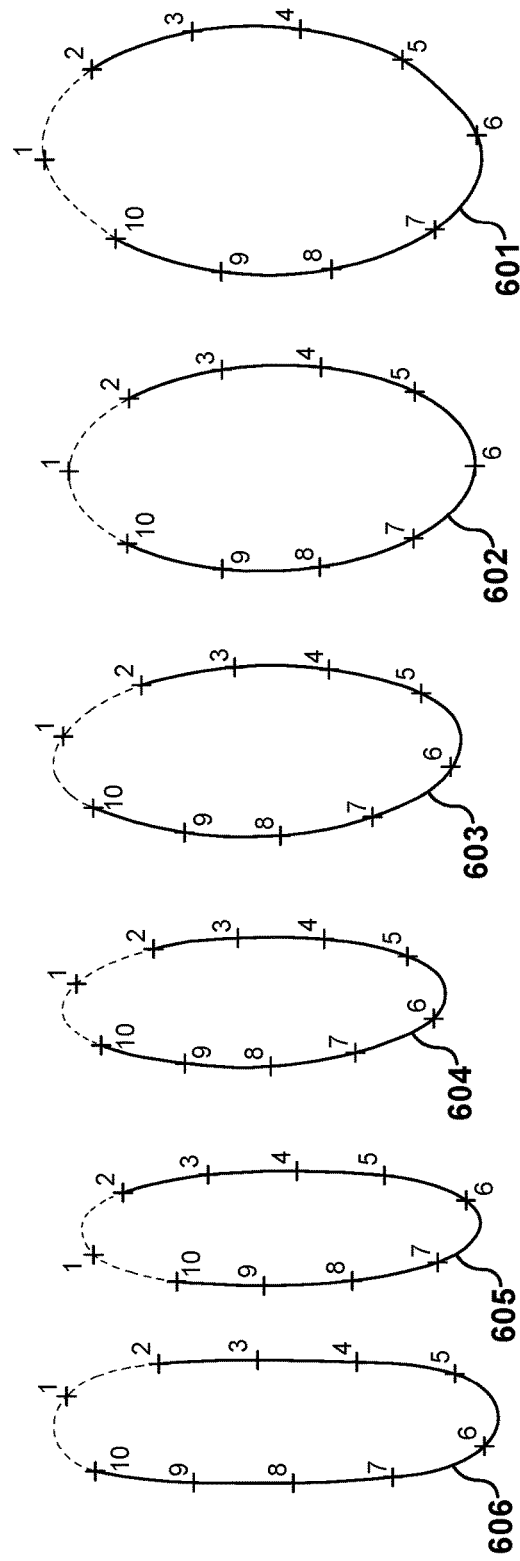
FIG. 7 is a schematic view of the example sections of FIG. 6 along the Y axis shown in FIG. 6 according to embodiments disclosed herein.
Figure 7:
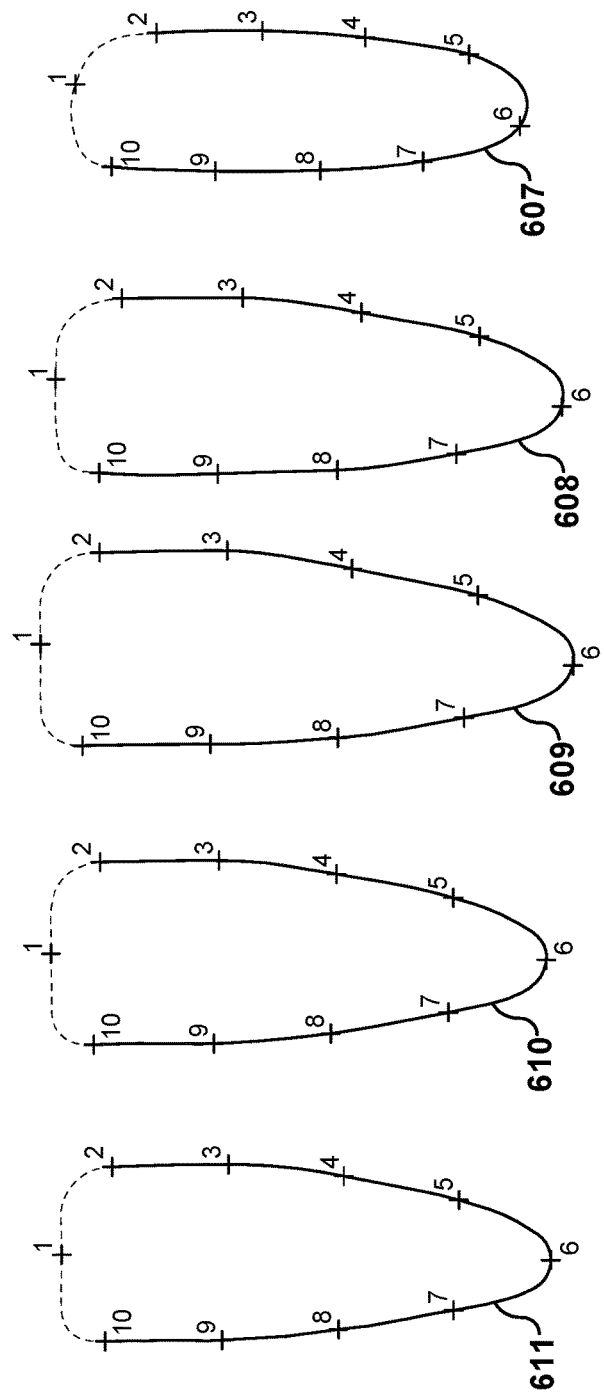

As seen in FIGS. 6 and 7, a profile of exit passage 150 can be described using a plurality of cross-sections 601-611 at predefined points or locations along length L (FIG. 6) of exit passage 150. Such cross-sections can, for example, be normal to a centerline of exit passage 150. Each cross-sectional shape of each section 601-611 can be described using points on a perimeter thereof represented by a set of X, Y, and Z coordinates relative to origin P (FIGS. 2 and 4-6). Coordinates for a specific example of similar cross-sectional shapes have been expressed in X-Y-Z values in TABLE I below. The predefined locations of the sections are not simply coordinates on one of the axes since the particular sections are not taken parallel to a plane defined by two of the coordinate axes. FIG. 6 shows a perspective view of an exit passage 150 that employs Cartesian coordinate values of X, Y and Z of eleven example sections 601-611 set forth in TABLE I. As particularly seen in FIG. 7, each section 601-611 in the example shown has nine defined points with respective X, Y, and Z coordinate values, which are listed in TABLE I. In FIG. 6, for example, an exit passage 150 may be made using coordinate values relative to origin P (FIGS. 2 and 4-6) that dictates where the Cartesian coordinate values of X, Y and Z set forth in TABLE I are employed to define exit passage 150.

Figure 8:
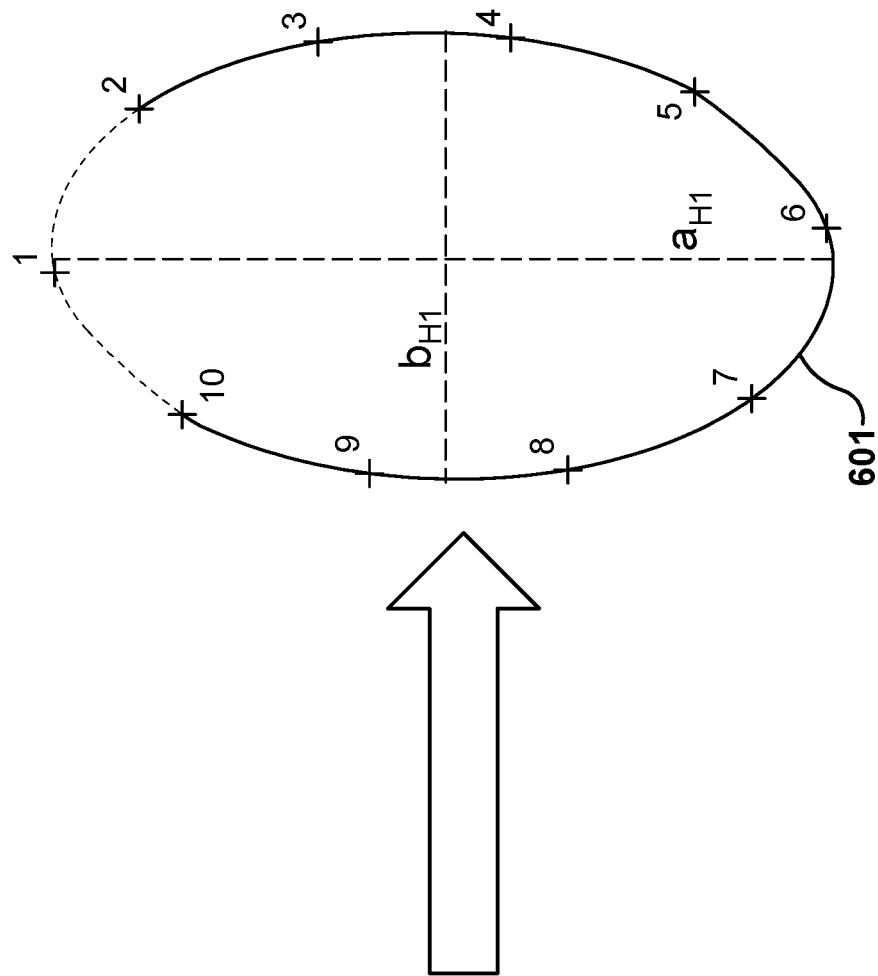
FIG. 8 is a schematic illustration of using a baseline cross-sectional shape of an exit of the cooling circuit (or cooling hole) to obtain a final cross-sectional shape thereof, as shown in FIGS. 6 and 7, according to embodiments disclosed herein.
Figure 8:
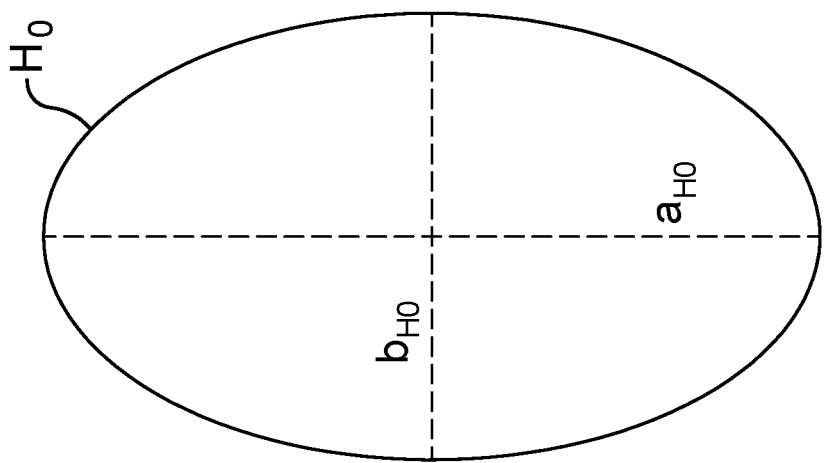

In embodiments, profile 601 of cooling hole 144 can be approximated using an elliptical shape $H_0$ as shown in FIG. 8, which can be a cooling hole baseline cross-sectional shape. As shown, elliptical cross-sectional shape $H_0$ can have a major axis $a_{H0}$ that can be oriented along a radial direction and/or parallel to trailing edge 142. Baseline cross-sectional shape $H_0$ can also have a minor axis $b_{H0}$ that can be oriented along a circumferential direction and/or perpendicular to an axial direction. Similarly, in embodiments, profile 601 can have a major axis $a_{H1}$ that can be oriented along a radial direction and/or parallel to trailing edge surface 143, and a minor axis $b_{H1}$ that can be oriented along a circumferential direction and/or perpendicular to an axial direction. According to some embodiments, a ratio of a length of the major axis $a_{H1}$ of profile 601 to a length of the minor axis $b_{H1}$ of profile 601 is in a range of from about 1.3 to about 1.7, such as about 1.5.

With reference to FIGS. 4 and 6, exit passage 150 can be described using a plurality of cross sections 601-611 at predefined points or locations along length L of exit passage 150, including cooling hole 144 at end 152 of exit passage 150. In FIG. 6, section 601 is a cross-sectional shape of cooling hole 144, and section 611 can be a cross-sectional shape of an entry 151 of exit passage 150. In the example set of sections, 10 points can be listed for each cross section 601-611, though it should be apparent that more or fewer points can be used for the respective perimeter of each cross section, and more or fewer cross sections can be used, as may be desired and/or appropriate.

According to embodiments described herein, a method of making an aerodynamic component 100 can be employed to arrive at suitable sets of coordinate values. For example, with reference to FIGS. 2-8, such a method can include creating or providing a digital model of aerodynamic component 100 and cooling circuit 146 thereof. As described above, cooling circuit 146 can include a cooling passage or exit passage, such as exit passage 150, defined in a body (body portion 134, FIG. 2) of aerodynamic component 100. Exit passage 150 can include cooling hole 144 at trailing edge 142 of component 100, and exit passage 150 can include an exit passage profile that has been optimized to promote cooling, to reduce component stress, and/or to reduce creep, thereby increasing useful life of component 100. As noted above, the exit passage profile can include cross-sectional shapes at predefined points or locations along length L of exit passage 150, as illustrated by sections 601-611 in FIG. 6. In embodiments, a baseline profile of exit passage 150 can be established, which can include cooling hole baseline cross-sectional shape $H_0$, as well as using additional cross-sectional baseline shapes at predefined locations along length L of exit passage 150.

The baseline profile of the exit passage can be used as an initial value of the exit passage profile in or with the digital model to simulate operation of aerodynamic component 100, which can include simulating an operating environment of aerodynamic component 100. A value of a first parameter can be retrieved from the simulated operation of the aerodynamic component 100, and the value can be compared to one of a previously measured value or an initial value to determine a difference therebetween. For example, first parameter can include surface temperature of aerodynamic component 100 at cooling hole 144, strain at the same or another location, pressure at the same or another location, or any other parameter as may be suitable and/or desired.

The exit passage profile in the digital model of aerodynamic component 100 can be adjusted responsive to the difference being greater than a threshold percentage value. That is, if the difference between a current value of the first parameter and the last value of the first parameter is above, for example, 10%, then the exit passage profile can be adjusted, such as by adjusting the cross-sectional shape at a predefined location being analyzed, such as the cross-sectional shape of cooling hole 144. By repeating simulating, retrieving, comparing, and adjusting until the difference is no more than the threshold percentage value, the exit passage profile as last adjusted can be assigned as a final exit passage profile. Aerodynamic component 100 can then be formed using the final exit passage profile, such as by casting or additive manufacturing (AM), for example.

In embodiments, repeating of simulating, retrieving, comparing, and adjusting is done at each predefined location for each respective cross-sectional shape of the exit passage profile starting with the cooling hole cross-sectional shape and working progressively inward. Each cross-sectional shape can be handled sequentially, where other cross-sectional shapes remain unchanged while a given cross-sectional shape is adjusted from baseline to final cross-sectional shape. That is, determining the final exit passage profile can include determining the final cross-sectional shape for each predefined point sequentially.

Alternatively, each cross-sectional shape can be processed taking effects of other cross-sectional shape adjustments into account, which can be said to simultaneously adjust two or more cross-sectional shapes in the exit passage profile. That is, determining the final exit passage profile can include determining the final cross-sectional shape for each predefined point simultaneously. For example, the first parameter can be measured at multiple predefined points, and one or more cross-sectional shapes can be adjusted to determine a difference in the first parameter at one or more of the predefined points, and this can be repeated to determine the final cross-sectional shapes of the predefined points at the same time.

Additionally, a combination of sequential and simultaneous adjustments could be used, and/or a final exit passage profile from one run could be used as an initial value or exit passage baseline profile for another run. Use of a previous final exit passage profile as a baseline profile for a subsequent run can be repeated until a difference in a second parameter is no more than a second threshold percentage value, thus optimizing the final exit passage profile in embodiments. In addition, embodiments can employ one or more instances of an artificial intelligence (AI) to estimate a desired adjustment for the exit passage profile, and adjusting the exit passage profile can be based at least on the estimated desired adjustment. Thus, a method according to embodiments can include establishing an instance of an artificial intelligence (AI), which is configured to be, or which has been, trained on at least one of thermodynamic modeling, aerospace engineering, and materials science.

An example of the results of application of the method according to embodiments is shown in FIGS. 6-8 and as Cartesian coordinates in X-Y-Z space in TABLE I, with an origin, such as origin P located at the intersection of radial axis S (FIG. 2) of aerodynamic component 100 with centerline A (FIGS. 1, 2, and 4-6) of gas turbine engine 10 in which aerodynamic component 100 will be deployed. As noted above, radial axis S can be a stacking axis and/or radial centerline of aerodynamic component 100 or a portion thereof. The X, Y, and Z coordinate values in TABLE I can expressed in any distance units and/or scaled up or down so long as the proportions are maintained. In TABLE I, the X, Y, and Z coordinate values are listed in inches. To scale an X, Y or Z value of TABLE I, the X, Y or Z value given in TABLE I can be multiplied by a desired scaling factor, which scaling factor should be applied to all such values to preserve proportions therebetween. By connecting the points described by the X, Y, and Z values for each section with smooth continuing arcs, each exit passage profile cross-section and/or cross-sectional shape can be fixed, and the exit passage profile between the cross-sections can be determined by smoothly connecting adjacent profile sections to one another, such as by connecting corresponding points therein, thus forming the nominal exit passage profile.

That is, points described by the X, Y, and Z values for each cross-sectional shape are connected by smooth continuing arcs to define respective cross-sectional shapes at each predefined location along at least a portion of the exit passage, the cross-sectional shapes being joined smoothly with one another to form the final exit passage profile. While 11 sections are used in the example, it should be noted that improved results can be achieved by using more sections or predefined locations along the length of the exit passage to describe the exit passage profile, and that with the use of more sections, the exit profile passage may deviate from the surface described by smoothly connecting the results using fewer profile sections. Similarly, while 10 points are used to describe each section in the example, improved results can be obtained by using more points to describe each section.

The values in TABLE I are generated and shown to three decimal places for determining the nominal profile of cooling or exit passage 150 at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in TABLE I. For example, a tolerance of about 10-20 percent of a width of the exit passage in a direction normal to any surface location along the exit passage profile can define an exit passage profile envelope for an aerodynamic component design at cold or room temperature. In other words, a distance of about 10-20 percent of a width of the exit passage in a direction normal to any surface location along the exit passage profile can define a range of variation between measured points on an actual exit passage wall surface and ideal positions of those points, particularly at a cold or room temperature, as embodied by the disclosure. The exit passage and aerodynamic component configuration, as embodied herein, is robust to this range of variation without impairment of mechanical and aerodynamic functions.

Likewise, as noted above, the profile and/or configuration can be scaled up or down, such as geometrically, without impairment of operation. Such scaling can be facilitated by multiplying the values by a common scaling factor, which may be a larger or smaller number of distance units than might have originally been used for an exit passage of a given size. For example, the values in TABLE I could be multiplied uniformly by a scaling factor of 2, 0.5, or any other desired scaling factor. In various embodiments, the X, Y, and Z distances are scalable as a function of the same constant or number to provide a scaled up or scaled down exit passage. Alternatively, the values could be multiplied by a larger or smaller desired height. Additionally, embodiments may use a portion of the values to construct a partial exit passage profile described thereby.

As referenced herein, the origin P (FIGS. 2 and 4-6) of the X, Y, Z coordinate system could be placed, for example, at an intersection of radial axis S (best seen in FIG. 2) and a centerline of gas turbine engine 10 (best seen as A in FIGS. 1 and 2), with the X axis colinear with the centerline, the Z axis colinear with the radial axis S, and the Y axis mutually perpendicular to the X and Y axes. As noted above, radial axis S can be a stacking axis and/or radial centerline of aerodynamic component 100 or a portion thereof. As additionally seen in FIG. 5, positive values of X are aft of origin P (toward aft edge 104), positive values of Z are toward and beyond aerodynamic component 100 from centerline A and the X axis, and positive (or larger) values of Y toward leading edge 106 of platform 102. Within each section, because point 1 was arbitrarily chosen (e.g, in an area at the top of the cross-sectional profile as indicated in FIG. 7), its value is omitted from TABLE I, and the respective arcuate portion of the profile that connects points 10 and 2 is shown in dotted lines.

TABLE I

[coordinates of cross-sectional shapes, in inches relative to origin P]

| Point | X | Y | Z |
|---|---|---|---|
| Section 1 | | | |
| 2 | 1.194 | −1.398 | 28.321 |
| 3 | 1.209 | −1.394 | 28.291 |
| 4 | 1.209 | −1.393 | 28.258 |
| 5 | 1.201 | −1.397 | 28.228 |
| 6 | 1.180 | −1.407 | 28.206 |
| 7 | 1.154 | −1.419 | 28.219 |
| 8 | 1.144 | −1.424 | 28.250 |
| 9 | 1.143 | −1.424 | 28.283 |
| 10 | 1.153 | −1.420 | 28.314 |
| Section 2 | | | |
| 2 | 1.184 | −1.372 | 28.311 |
| 3 | 1.191 | −1.369 | 28.284 |
| 4 | 1.191 | −1.369 | 28.256 |
| 5 | 1.184 | −1.372 | 28.229 |
| 6 | 1.165 | −1.381 | 28.212 |
| 7 | 1.146 | −1.390 | 28.229 |
| 8 | 1.139 | −1.393 | 28.256 |
| 9 | 1.139 | −1.393 | 28.284 |
| 10 | 1.146 | −1.390 | 28.311 |
| Section 3 | | | |
| 2 | 1.170 | −1.346 | 28.300 |
| 3 | 1.174 | −1.344 | 28.276 |
| 4 | 1.173 | −1.344 | 28.251 |
| 5 | 1.167 | −1.347 | 28.227 |
| 6 | 1.149 | −1.355 | 28.220 |
| 7 | 1.138 | −1.361 | 28.240 |
| 8 | 1.134 | −1.363 | 28.265 |
| 9 | 1.134 | −1.362 | 28.289 |
| 10 | 1.141 | −1.359 | 28.313 |
| Section 4 | | | |
| 2 | 1.155 | −1.319 | 28.298 |
| 3 | 1.158 | −1.318 | 28.275 |
| 4 | 1.157 | −1.318 | 28.251 |
| 5 | 1.153 | −1.320 | 28.229 |

TABLE I-continued

[coordinates of cross-sectional shapes, in inches relative to origin P]

| Point | X | Y | Z |
|---|---|---|---|
| 6 | 1.138 | −1.327 | 28.222 |
| 7 | 1.129 | −1.331 | 28.243 |
| 8 | 1.126 | −1.333 | 28.266 |
| 9 | 1.127 | −1.332 | 28.289 |
| 10 | 1.132 | −1.330 | 28.312 |
| Section 5 | | | |
| 2 | 1.140 | −1.293 | 28.311 |
| 3 | 1.144 | −1.291 | 28.289 |
| 4 | 1.144 | −1.291 | 28.266 |
| 5 | 1.143 | −1.292 | 28.243 |
| 6 | 1.137 | −1.295 | 28.222 |
| 7 | 1.123 | −1.301 | 28.229 |
| 8 | 1.118 | −1.303 | 28.252 |
| 9 | 1.117 | −1.304 | 28.275 |
| 10 | 1.119 | −1.303 | 28.297 |
| Section 6 | | | |
| 2 | 1.132 | −1.264 | 28.297 |
| 3 | 1.133 | −1.264 | 28.274 |
| 4 | 1.132 | −1.264 | 28.252 |
| 5 | 1.129 | −1.265 | 28.229 |
| 6 | 1.114 | −1.272 | 28.222 |
| 7 | 1.108 | −1.275 | 28.244 |
| 8 | 1.107 | −1.276 | 28.267 |
| 9 | 1.107 | −1.275 | 28.290 |
| 10 | 1.110 | −1.274 | 28.312 |
| Section 7 | | | |
| 2 | 1.123 | −1.235 | 28.302 |
| 3 | 1.123 | −1.235 | 28.279 |
| 4 | 1.121 | −1.236 | 28.255 |
| 5 | 1.118 | −1.237 | 28.232 |
| 6 | 1.103 | −1.244 | 28.221 |
| 7 | 1.096 | −1.248 | 28.243 |
| 8 | 1.095 | −1.248 | 28.266 |
| 9 | 1.095 | −1.248 | 28.290 |
| 10 | 1.096 | −1.248 | 28.313 |
| Section 8 | | | |
| 2 | 1.114 | −1.206 | 28.308 |
| 3 | 1.114 | −1.206 | 28.284 |
| 4 | 1.111 | −1.208 | 28.260 |
| 5 | 1.106 | −1.210 | 28.237 |
| 6 | 1.093 | −1.216 | 28.220 |
| 7 | 1.085 | −1.220 | 28.241 |
| 8 | 1.082 | −1.221 | 28.265 |
| 9 | 1.082 | −1.221 | 28.289 |
| 10 | 1.082 | −1.221 | 28.313 |
| Section 9 | | | |
| 2 | 1.103 | −1.178 | 28.310 |
| 3 | 1.103 | −1.178 | 28.286 |
| 4 | 1.099 | −1.180 | 28.262 |
| 5 | 1.095 | −1.182 | 28.238 |
| 6 | 1.082 | −1.188 | 28.220 |
| 7 | 1.073 | −1.192 | 28.241 |
| 8 | 1.070 | −1.193 | 28.265 |
| 9 | 1.069 | −1.194 | 28.290 |
| 10 | 1.069 | −1.194 | 28.314 |
| Section 10 | | | |
| 2 | 1.092 | −1.150 | 28.312 |
| 3 | 1.092 | −1.150 | 28.287 |
| 4 | 1.089 | −1.152 | 28.262 |
| 5 | 1.084 | −1.154 | 28.238 |
| 6 | 1.072 | −1.159 | 28.219 |
| 7 | 1.063 | −1.164 | 28.240 |
| 8 | 1.059 | −1.166 | 28.264 |
| 9 | 1.057 | −1.166 | 28.289 |
| 10 | 1.057 | −1.166 | 28.313 |
| Section 11 | | | |
| 2 | 1.080 | −1.122 | 28.314 |
| 3 | 1.081 | −1.122 | 28.288 |

TABLE I-continued

[coordinates of cross-sectional shapes, in inches relative to origin P]

| Point | X | Y | Z |
|---|---|---|---|
| 4 | 1.078 | −1.124 | 28.263 |
| 5 | 1.073 | −1.126 | 28.237 |
| 6 | 1.060 | −1.132 | 28.217 |
| 7 | 1.050 | −1.136 | 28.238 |
| 8 | 1.047 | −1.138 | 28.264 |
| 9 | 1.045 | −1.139 | 28.290 |
| 10 | 1.045 | −1.139 | 28.316 |

Embodiments of the disclosure can take the form of a gas turbine engine 10, seen in FIG. 1, including a compressor 14, a combustor 16 operatively coupled to compressor 14, and an expansion turbine 18 operatively coupled to combustor 16. Expansion turbine 18 can include a plurality of aerodynamic components 28 that can convert hot gas from combustor 16 into rotational motion. At least one of aerodynamic components 28 can include an airfoil 126 extending in a radial direction of expansion turbine 18, airfoil 126 having a trailing edge 142 with a trailing edge surface 143 extending radially. A cooling circuit 146 can include an exit passage 150 in airfoil 126 defined by an exit passage wall 154 in airfoil 126 and ending at a cooling hole 144 in trailing edge surface 143. Exit passage 150 can include an end portion 152 in which an exit passage wall 154 of exit passage 150 can follow a profile as defined by the coordinate values in TABLE I. In embodiments, an elliptical shape $H_0$ can approximate profile 601 of cooling hole 144, and a ratio of a length of a respective major axis to a length of a respective minor axis falls within a range of from 1.3 to 1.7, such as about 1.5.

A technical effect of embodiments disclosed herein is thermal strain reduction and longevity increase in aerodynamic components. By using baseline elliptical profiles and applying the iterative method in accordance with embodiments herein in cooling holes, strain in the aerodynamic component induced by heat can be significantly reduced, such as by 26% to 30%. Such thermal strain reductions can increase creep life of the trailing edge cooling hole, for example, by a factor of 5, and can increase the useful life of an aerodynamic component by a factor of 4.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," "substantially," or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application of such technology and to enable others of ordinary skill in the art to understand the various embodiments of the present disclosure and the possibility of various modifications of the disclosed embodiments, as may be suited to the particular use(s) contemplated.

What is claimed is:

1. A method of making an aerodynamic component comprising:
    creating a digital model of the aerodynamic component and a cooling circuit thereof, the cooling circuit including an exit passage defined in a body of the aerodynamic component and including a cooling hole at a trailing edge of the aerodynamic component, the exit passage including an exit passage profile;
    establishing a baseline profile of the exit passage and using the baseline profile of the exit passage as an initial value of the exit passage profile;
    simulating operation of the aerodynamic component using the digital model, including simulating an operating environment of the aerodynamic component and determining values of at least a first parameter of the aerodynamic component resulting from the simulated operation thereof, the at least a first parameter including at least one of temperature, pressure, and strain;
    comparing a value of the at least a first parameter from the simulated operation of the aerodynamic component to one of a previously measured value or an initial value to determine a difference therebetween;
    adjusting the exit passage profile in the digital model of the aerodynamic component responsive to the difference being greater than a threshold percentage value;
    repeating simulating, comparing, and adjusting until the difference is no more than the threshold percentage value;
    sending, once the difference is no more than the threshold percentage value, the digital model of the aerodynamic component with the final exit passage profile to at least one of a mold creation device, an additive manufacturing system, and a milling machine, whereby the exit passage profile as last adjusted is a final exit passage profile and the exit passage profile has been transformed from the baseline exit passage profile to the final exit passage profile; and
    making, using the at least one of the mold creation device, the additive manufacturing system, and the milling machine, the aerodynamic component including the final exit passage profile using the digital model of the aerodynamic component with the final exit passage profile.

2. The method of claim 1, wherein the forming includes casting the aerodynamic component with the final exit passage profile from a mold thereof created with the mold creation device.

3. The method of claim 1, wherein the forming includes using the additive manufacturing (AM) system and at least the digital model of the aerodynamic component with the final exit passage profile.

4. The method of claim 1, wherein the exit passage baseline profile includes a plurality of baseline cross-sectional shapes thereof, the plurality of baseline cross-sectional shapes including a cooling hole baseline cross-sectional shape in a plane parallel to the trailing edge at the cooling hole; and wherein the adjusting the exit passage profile includes adjusting each baseline cross-sectional shape of the plurality of baseline cross-sectional shapes.

5. The method of claim 4, wherein the simulating and the determining, the comparing, the adjusting, and the repeating are done for each of the plurality of baseline cross-sectional shapes starting with the cooling hole baseline cross-sectional shape and then each progressively farther inward baseline cross-sectional shape of the plurality of baseline cross-sectional shapes.

6. The method of claim 1, further comprising establishing an instance of an artificial intelligence (AI); training the AI instance on at least one of thermodynamic modeling, aerospace engineering, and materials science; and using the AI instance to estimate a desired adjustment for the exit passage profile; and wherein the adjusting is based at least on the estimated desired adjustment.

7. The method of making an aerodynamic component of claim 1, wherein the final exit passage profile includes a portion substantially in accordance with the Cartesian coordinate values of X, Y, and Z set forth in TABLE I, with an origin located at an intersection of a radial axis of the aerodynamic component with a centerline of a gas turbine engine in which the aerodynamic component will be deployed, wherein the Cartesian coordinate values are expressed in units of distance, and wherein points described by the X, Y, and Z values for each cross-sectional shape are connected by smooth continuing arcs to define respective cross-sectional shapes at each predefined location along at least a portion of the exit passage, the cross-sectional shapes being joined smoothly with one another to form the final exit passage profile.

8. A method of making an aerodynamic component, comprising:
  providing a digital model of the aerodynamic component including a cooling circuit defined in a body thereof, the cooling circuit including an exit passage extending from an entry thereof to a cooling hole at a trailing edge of the body, the exit passage having an exit passage profile including a plurality of cross-sectional shapes at predefined points along a length of the exit passage, the predefined points including at least the cooling hole of the exit passage and the entry of the exit passage;
  determining, using at least an exit passage baseline profile including a baseline cross-sectional shape for each of the predefined points, a final exit passage profile, including determining a respective final cross-sectional shape for the respective cross-sectional shape at each of the predefined points starting with the cooling hole and progressing inward to the entry, by:
    simulating operation of the aerodynamic component and an operating environment thereof using at least the exit passage baseline profile, including determining values of at least a first parameter of the aerodynamic component resulting from the simulated operation thereof, the at least a first parameter including at least one of temperature, pressure, and strain;
    comparing a value of the at least a first parameter from the simulated operation of the aerodynamic component to one of a respective previously measured value or a respective initial value to determine a respective difference therebetween;
    adjusting the cross-sectional shape responsive to at least one of the differences being greater than a threshold percentage value; and
    repeating the simulating, the comparing, and the adjusting until each difference is no more than the threshold percentage value, whereby the cross-sectional shape as last adjusted is a final cross-sectional shape for the predefined point transformed from the baseline cross-sectional shape;
  sending, once a final cross-sectional shape has been determined for each predefined point, the digital model of the aerodynamic component including the final exit passage profile to at least one of a mold creation device, an additive manufacturing system, and a milling machine; and
  making, using the at least one of the mold creation device, the additive manufacturing system, and the milling machine, the aerodynamic component including the final exit passage profile using the stored digital model of the aerodynamic component including the final exit passage profile.

9. The method of claim 8, wherein the determining the final exit passage profile includes determining the final cross-sectional shape for each predefined point sequentially.

10. The method of claim 8, wherein the determining the final exit passage profile includes determining the final cross-sectional shape for each predefined point simultaneously.

11. The method of claim 8, wherein the providing the exit passage baseline profile includes using a previously determined final exit passage profile as the exit passage baseline profile.

12. The method of claim 11, wherein the determining the final exit passage profile is repeated using each subsequent final exit passage profile until a difference in values of a second parameter retrieved during simulating from one repetition to a next repetition is no more than a second threshold percentage value.

13. The method of claim 8, wherein the cooling hole baseline cross-sectional shape is an elliptical cross-sectional shape that includes a major axis and a minor axis, and a ratio of a length of the major axis to a length of the minor axis is in a range of from about 1.3 to about 1.7.

* * * * *